March 1, 1932.  F. A. ANTON  1,847,459
WINDOW AWNING
Filed Dec. 8, 1930   2 Sheets-Sheet 1
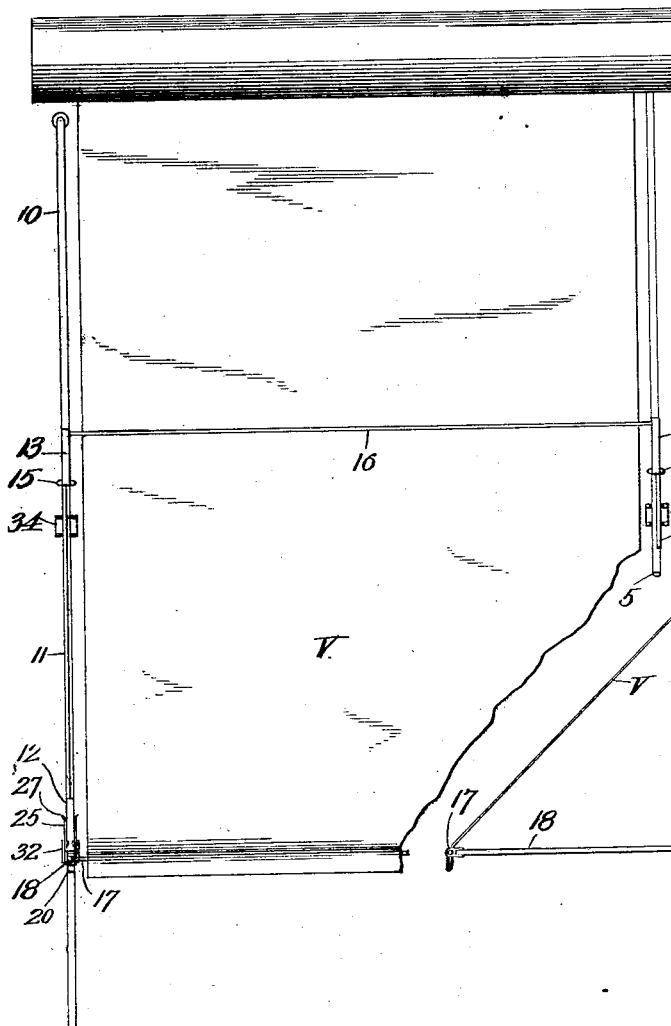
Fig.1.
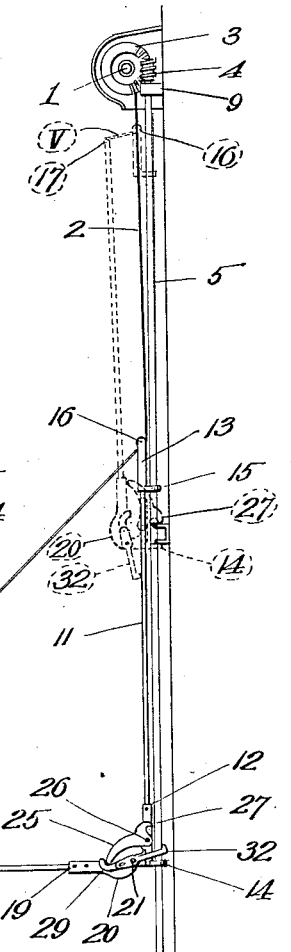
Fig.2.
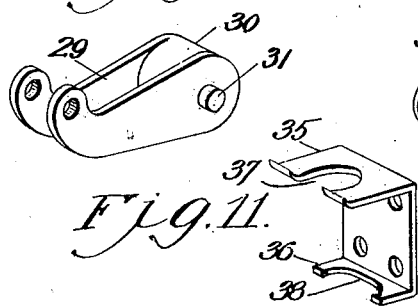
Fig.9. Fig.10. Fig.11.
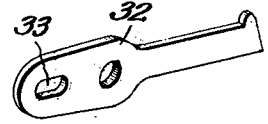
Inventor
Frederick A. Anton
By Thorpe Thorpe
Attorneys

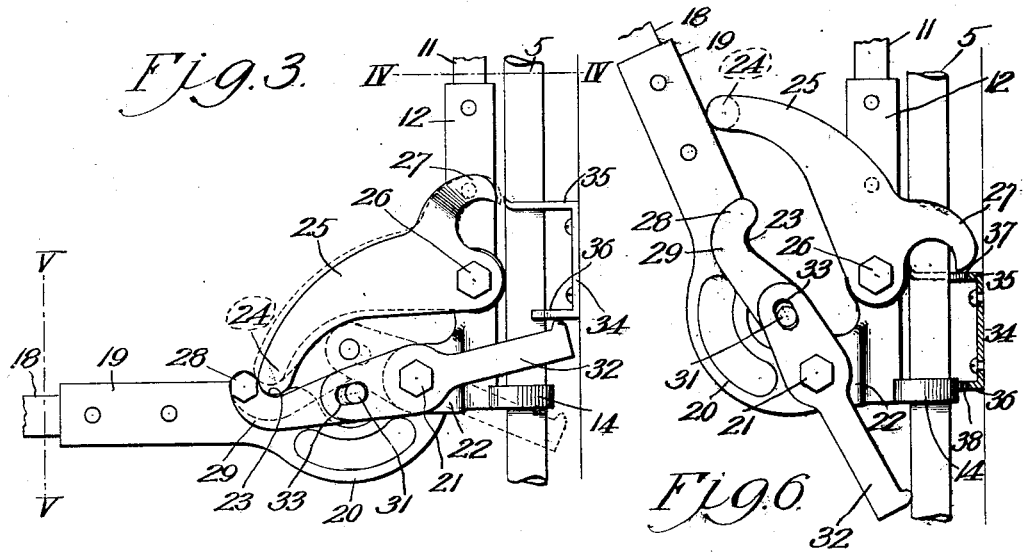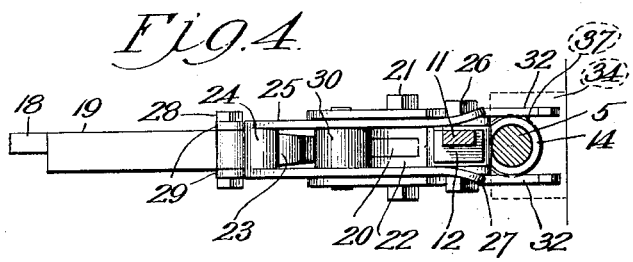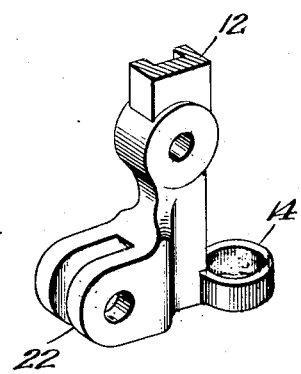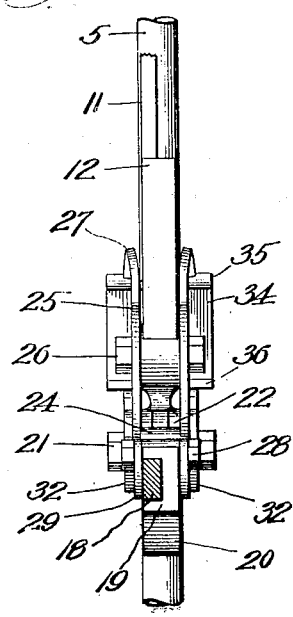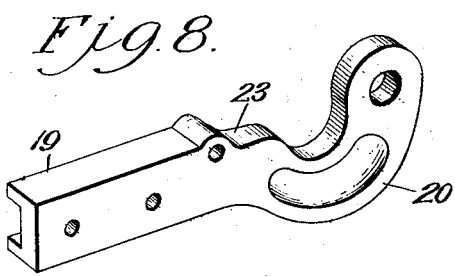

Patented Mar. 1, 1932

1,847,459

UNITED STATES PATENT OFFICE

FREDERICK A. ANTON, OF TOPEKA, KANSAS

WINDOW AWNING

Application filed December 8, 1930. Serial No. 500,858.

This invention relates to roller type window awnings of that class providing a visor which, when the awning fabric is unwound to its fullest extent or to any extent, will perform its shading function without interfering with the free circulation of air with relation to the window and without entirely shutting light from the window where the latter is covered by the visor.

One of the objects of the invention is to provide an awning of the class indicated, for a manually operable roller—as distinguished from a spring-actuated roller—having connected slide frames at opposite sides of the window and a U-shaped visor frame extending across the window and pivotally mounted on the slide frames and attached at its free end to the lower end of the awning fabric, the fabric also slidably engaging said connection of the slide frames so that the latter and the parts carried thereby, shall be wholly and at all times sustained by the fabric, and in which the fabric shall serve to limit the extent of opening swinging movement of the visor frame and thus prevent such motion as might result in a clicking or chattering sound in windy weather.

Another object, in a construction of the character above-outlined, is to provide the pivoted visor frame with a rearwardly and upwardly facing shoulder and a dog pivoted on the slide structure for engagement with said shoulder to lock the visor frame from swinging upwardly under gusts of wind impinging on the underside of the fabric or under any upward pressure on or pull applied to the visor frame, upward and downward movement of the visor frame being objectionable both from a visual and audible standpoint.

Another object is to provide means for tripping the dog from locking engagement with the visor frame, and means fixed with relation to the window, for causing said tripping means to function when the slide frames have been elevated by the fabric as the latter is wound on the roller to a predetermined height.

A still further object is to utilize the gravitative force of the slide frames and visor frame, as the unwinding of the fabric is started, to cause the said fixed means to force the dog to apply continuing forward and downward pressure on the visor frame to swing it to fully open position and then lock it in such position by automatic reengagement with the shoulder of the visor frame.

With the objects named in view and others as will hereinafter appear, the invention consists in certain new and useful features of construction and organization of parts as hereinafter described and claimed; and in order that it may be fully understood, reference is to be had to the accompanying drawings, in which:—

Figure 1 is a fragmentary front view of a window awning embodying the invention, the visor being indicated at an intermediate point in its adjustment relative to the window casing.

Figure 2 is a side view of the awning, and also discloses, in dotted lines, the approximate folded position of the visor frame relative to the slide frames, it being understood that the visor frame never swings to the closed or folded position indicated until the slide frame structure has first been raised to approximately the upward limit of adjustment so that when the visor frame folds or closes, the visor portion of the awning fabric disappears and practically the entire area of the window is exposed and unshaded.

Figure 3 is an enlarged side elevational detail showing the slide frame structure and visor frame in the locked relation which exists until they have been elevated almost to their fullest extent, and also shows a fixed means for effecting unlocking action as their upward movement terminates so that the continued winding action of the roller shall then effect the folding operation of the visor.

Figure 4 is a horizontal section on the line IV—IV of Figure 3.

Figure 5 is a vertical section on the line V—V of Figure 3.

Figure 6 is a side view showing how the locking dog is caused to unfold the visor frame, as the unwinding of the fabric and lowering of the slide frame structure is started.

Figure 7 is a fragmentary perspective view of one of the slide frames.

Figure 8 is a fragmentary perspective view of one of the side arms of the visor frame.

Figure 9 is a detail perspective view of a lever member for engaging and tripping the locking dog from engagement with the shoulder of the visor frame.

Figure 10 is a detail perspective view of a lever member for operating the lever of Figure 9.

Figure 11 is a bracket for operating the lever of Figure 10, as the slide frames attain their upward limit of travel, and for causing the dog to swing the visor frame to open position as the fabric unwinding action and consequent descent of the slide frames commences.

Referring now to the drawings in detail, 1 indicates a roller extending across and in proximity to the top of a window and adapted to be journaled in any suitable manner, and 2 is an awning fabric for winding and unwinding action on the roller. Any conventional or otherwise suitable means may be employed to operate the roller, that shown being a worm wheel 3, a worm 4, a vertical shaft 5 for the worm, and a beveled gearing 6 for transmitting power from a crank shaft 7, to the shaft 5. A bracket 8 is secured to the window casing C, to provide a housing for the gearing and a journal for the adjacent ends of the shafts, the upper end of shaft 5 being journaled in a bearing 9. There will be two vertical guides at opposite sides of the window, one of which may be and for convenience is shown as the shaft 5, and the other is shown as a stationary vertical rod 10.

At each side of the window is a slide frame for travel up and down on its respective guide, each slide frame comprising a vertical bar 11, a lower bracket 12 and an upper bracket 13, each bracket 12 having an eye 14 and each bracket 13 an alined eye 15, slidably engaging the respective guide. The slide frames carry a horizontal connecting rod or roller 16 at their upper ends, engaged by the awning fabric 2 vertically below the roller 1, to define the upper margin of a visor V when the evolution of the latter is effected by a slight unwinding of the fabric, as will hereinafter appear.

A U-shaped frame to cooperate with the connecting rod or roller 16 and fabric, in the formation or production of a visor at the lower end of the fabric, consists of a bridge or cross-portion 17 paralleling roller 16, and side arms 18, the lower end of the fabric being secured to portion 17 between the side arms. The latter are equipped with similar brackets 19 formed at their rear ends with inverted arch-shaped extensions 20 pivoted at their rear ends at 21 in bifurcated ears 22 projecting forwardly from brackets 12, and said extensions have upwardly and rearwardly facing shoulders 23 respectively engaged, when the visor frame is in open or operative position, with the rounded front ends 24 of a pair of bifurcated dogs 25 pivoted at 26 to the respective brackets 12, and the dogs have rearwardly-projecting claw-shaped arms 27 flared apart a distance slightly exceeding the external diameter of the rings 14 and 15, for a purpose which will hereinafter appear. As it is practicable, assuming the visor frame possesses reasonable stiffness or rigidity, to employ a single dog at one side of the window instead of a dog at each side, subsequent reference thereto and to the slide frame shoulders is in the singular as the structure is thoroughly operative with either a single or double control, and the same statement applies with respect to the tripping mechanism hereinafter described, although Figure 1, shows the fixed element of such mechanism at both sides of the window, and the complemental tripping mechanism for the left-hand side of the window frame is also shown in said figure.

When the dog is in engagement with the concave shoulder 23, the visor frame is locked in open or operative position, and for effecting unlocking action of the dog preliminary to collapsing action of the visor frame, a tripping mechanism is provided preferably constructed, as follows: Pivotally mounted on and projecting rearwardly from bolt 28 carried by a visor frame extension 19 and a pivot 21 for said frame, is a compound lever composed of two members, one member being preferably of bifurcated type to straddle the extension, and comprising a pair of arms 29 projecting from a relatively heavy cross-connection 30 having end pins 31, and the other member preferably comprising a pair of like parts or levers 32 to fit against opposite sides of the extension and pivoted on the respective pivot 21 and provided with slots 33 engaging the pins 31 of the companion member. The arms 29 when the visor is open, underlie and are slightly spaced from the front end of the dog, so that they shall not engage the dog until there has been an appreciable movement imparted to the lever members 32. The pair of lever members 32 project rearwardly beyond and at opposite sides of the bracket 12, and are spaced apart about the same distance as the flared arms 27 of the dog, so that, when the visor frame has been raised to almost its highest point of adjustment, the rear ends of the said levers shall encounter and be operated by bracket 34 secured to the window casing. The bracket 34 preferably consists of an upright portion provided with forward-projecting arms 35 and 36, spaced vertically apart a distance approximating that between the horizontal planes of the rear ends of the lever members 32 and the dog arms 27, and said bracket arms are respectively provided with recesses 37 and 38 large enough for the free passage therethrough of the rings 14, but too narrow for the passage of the rear ends of the said levers or dog arms. The bracket 34 is disposed a distance below the roller slightly greater than the length of the visor frame arms 18, so that when the fabric is wound up enough to cause the rear ends of the levers 32 to abut the underside of the bracket arm 36, there is sufficient space left between the latter and the roller, to permit the visor frame to swing upwardly on pivots 21, to an approximately vertical position, as shown in Figure 2.

Assuming that the visor is in open or operative position and the dog is locked as shown in Figure 2, and in full lines in Figure 3, it will be apparent that by winding the fabric on the roller or unwinding it therefrom, the slide frames and visor will be moved upwardly or will move downwardly by gravity as the case may be, without any tendency on the part of the visor to collapse or unfold, and that consequently the visor will function at the lowest position of adjustment and at every point up to that where it is desirable for its collapse to occur, which point is a distance below the roller slightly exceeding the length of the arms 18 (see Figure 2), at which point the bracket 34 is located for the purpose of effecting the tripping of the dog in the upward movement and of causing the dog, in the downward movement, to start the visor frame on its swing from collapsed to open position. When the fabric is wound up sufficiently, the rear ends of lever members 32 abut the bottom arm of bracket 34, and said members are therefore rocked and impart upward swinging movement to the bifurcated members 29, and cause the latter to apply upward pressure on the dog, it being noted that by the compound leverage provided, the resistance of the dog is easily overcome, and that only a slight lifting of the front end of the dog—with the parts proportioned as shown—is necessary (see dotted lines Figure 3), as the pull of the fabric as the winding action continues, starts the visor frame on its upward swing and it then continues the lifting of the dog started by the compound lever, the visor frame and dog when such movement ends occupying the positions approximately shown in dotted lines Figure 2, it being noted that at such time, only a small portion of the fabric is exposed below the roller and that consequently nearly the entire area of the window is exposed. It will also be noted by reference to Figure 3, that at the start of the operation of lever members 32 by abutment against the bracket 34, the rear extremities of the arms 27 of the dog are in proximity to but slightly forward of the vertical plane of the top arm of the bracket, and that by the time the rear ends of lever-arms 32 are depressed enough through upward travel of the slide frames, to effect tripping of the dog to the dotted line position shown in Figure 3, the rear ends of the dog will be in a slightly higher plane than the upper arm of the bracket 34 so that, as the visor frame swings upwardly and continues the upward pivotal action of the dog started by the lever members 32, as explained, it causes the rear ends of the arms 27 of the dog, by the time the collapse of the visor frame is completed, to overlie the top arm of the bracket 34 (see Figures 2 and 6), it being noted that the pull of the awning fabric from the roller holds the slide frames elevated and the visor frame in collapsed or substantially vertical position, with the window, in effect, fully uncovered or exposed, because the only part of the fabric visible would be that extending from the rod 16 to the rod 17 at such time in proximity to the said rod 16.

When the use of a visor is desired, the unwinding of the fabric is started. This permits the slide frames to start to gravitate or slide downward on the guides 5 and 10, and causes the rear ends of the arms 27 of the dog to abut and fulcrum upon the top arm of bracket 34. The dog therefore is caused to swing forwardly and downwardly and apply a forward push or pressure on the arms 18 of the visor frame (see Figure 6), to start the opening or downward swinging movement of the visor frame and the consequent production of a visor, it being noted that as the visor frame starts it is followed by the dog even after the arms 27 clear the bracket, because the dog is so proportioned and mounted that its tendency is to swing downword and forward. As the visor frame attains its horizontal position, the dog reengages the concave shoulder 23 and thus locks the visor frame in its open position, this result occurring very shortly after the gravitative or downward sliding action of the slide frame starts, so that continued unwinding of the fabric will merely effect a lowering of the already spread or open visor, the rewinding action of the roller of course reelevating the open visor, until the rear ends of the lever members 32 again abut and are operated by the lever arms of the brackets.

The above description applies to the preferred construction, it being understood that the protection sought contemplates not only changes in proportions and details which do not involve departure in principle and mode of operation, but also the use of a means to take up the weight of the slide frames from the fabric when the slide frames are fully lowered. In this case, however, it is desirable that when the awning is fully lowered and the slide frames are sustained by the means or support mentioned, the fabric must not be unwound enough to slacken, as in such event the slide frames being sustained by the stop means or support, it would be possible for the visor frame to sag pivotally downward enough to leave a space between its shoulder and the locking dog. If this occurred, with every strong gust of wind impinging on the underside of the visor portion of the fabric, the visor frame would move upwardly until its shoulder encountered the locking dog and an objectionable clicking sound would result. If, however, the fabric while permitting the slide frames to rest on the stop means, is short enough to prevent pivotally sagging of the visor frame, the shoulder of the latter will be retained in contact with the dog and hence prevented from swinging upwardly and producing clicking sounds under the windy condition mentioned. The stop means is indicated at 39, Figure 2, as a bracket projecting from the window casing in the path of downward movement of the slide frame structure.

From the foregoing it will be apparent that while there can be no accidental collapsing or opening action of the visor, the dog will be tripped without imposing any more strain on the fabric than enough to raise the slide frames and visor upwardly; and that only the gravitative force of the said parts, as the fabric is unwound, is required to cause the dog to start the opening movement of the visor frame, the opening movement of course being controlled by the speed with which the fabric is permitted to unwind. Ordinarily, the slide frames will descend, but a short distance by the time the visor frame is fully opened and then continued unwinding of the fabric will permit the slide frames and the spread visor to move downwardly, it being noted that as the visor attains its fully opened position, the dog automatically relocks it in such position, as at such time gravitative force has caused the compound lever to return to its initial position (see full lines in Figure 3), where it is beyond the path of downward movement of the dog, it being also noted that the part 30 of the compound lever is intended to be of such weight that the proper gravitative action of said lever is insured. All further operations are merely repetitions of those described.

From the above description and drawings, it will be apparent that I have produced a construction embodying all of the features of advantage set forth as desirable, and while I have described and claimed the preferred embodiment of the invention, it is to be understood that I reserve the right to make all changes falling within the spirit of the invention and without the ambit of the prior art.

I claim:—

1. A window awning comprising a roller and a fabric for winding and unwinding thereon, a pair of vertical guides, slide frames on said guides having a connecting cross-rod engaging the outer surface of the fabric, a substantially U-shaped visor frame pivoted to the slide frames and secured to one end of the awning fabric, a dog pivotally carried by one of the slide frames and engaging the visor frame when the latter is in open position to prevent upward swinging movement thereof, and means for tripping the dog at a fixed point in the upward travel of the slide frames to permit the visor frame to swing upwardly.

2. A window awning comprising a roller and a fabric for winding and unwinding thereon, a pair of vertical guides, slide frames on said guides having a connecting cross rod engaging the outer surface of the fabric, a substantially U-shaped visor frame pivoted to the slide frames and secured to one end of the awning fabric, a dog pivotally carried by one of the slide frames and engaging the visor frame when the latter is in open position to prevent upward swinging movement thereof, and means for effecting the tripping of the dog at a fixed point in the upward travel of the slide frames to permit the visor frame to swing upwardly and for operating the dog on downward travel of the slide frames to cause the dog to start the visor frame on its opening movement.

3. A window awning comprising a roller and a fabric for winding and unwinding thereon, a pair of vertical guides, slide frames on said guides having a connecting cross rod engaging the outer surface of the fabric, a substantially U-shaped visor frame pivoted to the slide frames and secured to one end of the awning fabric, a dog pivotally carried by one of the slide frames and engaging the visor frame when the latter is in open position to prevent upward swinging movement thereof; the visor frame at the end of its upward swinging movement disposing the dog in a predetermined position, and means for effecting reverse operation of the dog from said predetermined position when the slide frames start downward, to cause the dog to apply pressure upon and start downward swinging movement of the visor frame.

4. A window awning comprising a roller and a fabric for winding and unwinding thereon, a pair of vertical guides, slide frames on said guides having a connecting cross rod engaging the outer surface of the fabric, a substantially U-shaped visor frame pivoted to the slide frames and secured to one end of the awning fabric, a dog pivotally carried by one of the slide frames and engaging the visor frame when the latter is in open position to prevent upward swinging movement thereof, lever means on the dog-carrying slide frame, and means for causing the lever means, at a certain point in the upward travel of the slide frames, to effect the tripping of the dog.

5. A window awning comprising a roller and a fabric for winding and unwinding thereon, a pair of vertical guides, slide frames on said guides having a connecting cross rod engaging the outer surface of the fabric, a substantially U-shaped visor frame pivoted to the slide frames and secured to one end of the awning fabric, a dog pivotally carried by one of the slide frames and engaging the visor frame when the latter is in open position to prevent upward swinging movement thereof, a compound lever means carried by the dog-carrying slide frame, and fixed means in the path of upward movement of an element of the compound lever means to rock the same and cause it to rock another of the compound lever elements upward against the dog to trip same from locking position relative to the visor frame.

6. A window awning comprising a roller and a fabric for winding and unwinding thereon, a pair of vertical guides, slide frames on said guides having a connecting cross rod engaging the outer surface of the fabric, a substantially U-shaped visor frame pivoted to the slide frames and secured to one end of the awning fabric, a dog pivotally carried by one of the slide frames and engaging the visor frame when the latter is in open position to prevent upward swinging movement thereof, a compound lever means carried by the dog-carrying slide frame, and fixed means in the path of upward movement of an element of the compound lever means to rock the same and cause it to rock another of the compound lever elements upward against the dog to trip same from locking position relative to the visor frame; the compound lever members having different fulcrum points and a pin and slot connection, and one of the members having a relatively heavy portion at its pin and slot connected end to insure downward movement of the connected ends of the lever members when same are disengaged by the fixed means.

7. In a window awning, a pair of slide frames, a U-shaped visor frame pivoted on and connecting the slide frames, and adapted to stand in open or closed position and provided with a shoulder facing upwardly and rearwardly when the visor is in open position, a dog pivoted to the slide frame structure and engaging said shoulder to lock the visor frame in open position, and means for tripping the dog upwardly to unlocking position relative to the shoulder.

In testimony whereof I affix my signature.

FREDERICK A. ANTON.